United States Patent
Ashman et al.

(10) Patent No.: US 6,234,284 B1
(45) Date of Patent: May 22, 2001

(54) FRICTION PAD FOR A DISC BRAKE ASSEMBLY

(75) Inventors: Glynn Ashman, Stourbridge; Alan Terance Bowler, Redditch, both of (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/402,567
(22) PCT Filed: Oct. 5, 1999
(86) PCT No.: PCT/GB98/00123
 § 371 Date: Apr. 24, 2000
 § 102(e) Date: Apr. 24, 2000
(87) PCT Pub. No.: WO98/31949
 PCT Pub. Date: Jul. 23, 1998

(30) Foreign Application Priority Data

Jan. 18, 1997 (GB) .................................................. 9701025

(51) Int. Cl.$^7$ .................................................. F16D 69/02
(52) U.S. Cl. ........................ 188/250 B; 188/73.1
(58) Field of Search ................. 188/73.1, 250 B, 188/250 G

(56) References Cited

U.S. PATENT DOCUMENTS 5,954,163 * 9/1999 Suzuki et al. .................... 188/250 G
6,003,642 * 12/1999 Mori et al. ........................ 188/73.44

* cited by examiner

*Primary Examiner*—Christopher P. Schwartz
(74) *Attorney, Agent, or Firm*—Laff, Whitesel & Saret, Ltd.; J. Warren Whitesel

(57) ABSTRACT

A disc brake assembly is disclosed of the kind in which a friction pad (3) is applied to one face of a rotatable disc, in which the friction pad is provided with one or more protrusions (8, 9) which project from the leading radial edge in a circumferential direction, the radial thickness ($r_1$) of the projection being small relative to the total radial thickness (R) of the pad, the arrangement being such that in the event of tilting of the pad assembly with respect to the disc, where the brake is in the off position, contact between the protrusion and the disc prevents contact between the rest of the pad and the disc. Preferably, one protrusion is provided at each corner of the pad. This helps to reduce wear of the disc producing judder vibration during braking by reducing disc thickness variation.

13 Claims, 5 Drawing Sheets

| | STANDARD | 5 RADIAL 3 TANGENTIAL | 5 RADIAL 6 TANGENTIAL | 6.5 RADIAL (TOP) 7.5 RADIAL (BOTTOM) TANGENTIAL | 10 RADIAL 6 TANGENTIAL | 5 RADIAL 9 TANGENTIAL | 10 RADIAL 9 TANGENTIAL | 15 RADIAL 12 TANGENTIAL |
|---|---|---|---|---|---|---|---|---|
| TIME (HOURS) | 68 | 96.5 | 87.5 | 97 | 72 | 96 | 96 | 122.5 |
| OUTER DTV (μm) | 61 | 42 | 11 | 13 | 8 | 8 | 18 | 36 |
| CENTRE DTV (μm) | 67 | 10 | 6 | 6 | 6 | 5 | 5 | 10 |
| INNER DTV (μm) | 71 | 25 | 7 | 3 | 5 | 4 | 12 | 4 |
| INBOARD RUNOUT (μm) | 13 | 88 | 85 | 97 | 90 | 79 | 74 | 73 |
| OUTBOARD RUNOUT (μm) | 75 | 88 | 84 | 97 | 89 | 77 | 73 | 79 |
| TORQUE VARIATION (Nm) | 109 | 28 | 19 | 11 | 7 | 6 | 21 | 14 |
| PRESSURE VARIATION (bar) | 4.1 | 0.9 | 0.5 | 0.2 | 0.2 | 0.2 | 0.8 | 0.9 |

NB. DTV AT START OF ALL TESTS LESS THAN 5μm

Fig. 9

FRICTION PAD FOR A DISC BRAKE ASSEMBLY

This invention relates to improvements in disc brakes for vehicles of the kind in which a friction pad assembly is adapted to be applied to one face of a rotatable disc by brake applying means housed in a housing mounted on a relatively stationary part adjacent to the disc, and the pad assembly is guided for movement towards and away from the disc on drag taking surfaces which take the drag on the friction pad assembly when the brake is applied. This invention also relates to improvements in friction pad assemblies for use in disc brakes of the kind set forth.

In disc brakes of the kind set forth the friction pad assembly comprises a pad of friction material carried by a rigid backing plate of which circumferentially spaced leading and trailing end edges slidably cooperate with the drag taking surfaces and the pad is of a circumferential length less than the backing plate.

When the brake pad is applied, the pad makes contact with the disc over an annular region of the disc bounded by an inner and an outer concentric circle. The inner circle is defined by the inner edge of the pad (relative to the axis of the brake disc). The outer circle is defined by the outer edge of the pad. This annular region is referred to hereinafter as the braked area of the brake disc.

It is known that judder vibration can occur during braking when the braked area of the brake disc is of uneven thickness. A common source of disc thickness variation (DTV) is "casual" wear of the braking surface caused by light contact between the pad and the brake disc when the vehicle is running but the brake is not applied i.e. in the off position. Observation of the brake pads shows that the pad surface is often at a slight angle to the brake disc surface caused by light rubbing contact between the leading edge of the pad and disc for normal rotation of the disc in a forward direction in the off position of the brake.

The slight rubbing of the brake pad on the brake disc at the region of contact wears away the disc and can cause DTV.

We have appreciated that the degree of DTV which can be tolerated at the innermost and outermost edges of the pad is greater than that which can be tolerated towards the central region of the braked area, i.e. wear at the edges can exceed wear at the central region before similar degrees of vibration occur.

According to our invention, in a disc brake of the kind set forth for vehicles, the friction pad is provided with at least one protrusion which projects from the leading radial edge of the pad in a circumferential direction, the radial thickness of the protrusion being small in comparison with the total radial thickness of the pad, and the arrangement being such that in the event of tilting of the pad assembly with respect of the disc where the brake is in the off position, contact between the protrusion and the disc prevents contact between the remainder of the surface area of the pad and the disc.

Preferably the protrusion is integral with the material of the pad.

Preferably the pad is provided at its radially most inner and outer edges, at least of its leading edge, with circumferentially projecting protrusions, and the sum of the radial thickness of the protrusions is also small in comparison with the total radial thickness of the pad.

In one preferred arrangement, the leading and trailing edges of the brake pad are adapted to prevent the said contact over the central portion of the braked area of the brake disc, the edge being provided with a pair of circumferential projecting protrusions.

Thus, by the present invention, the new pad may have inner and outer "wear regions" defined by the leading and trailing edges which prevent wear (and hence DTV) over the central portion of the braked area of the brake disc.

Preferably, the brake pad is adapted so that on each of the leading and trailing edges an inner and outer protrusion is provided in a region proximal to the respective innermost and outermost portions of the edge of the brake pad. Preferably, each protrusion may define a single contact point in the event of pad tilt. Thus, each "wear region" is in the form of a single point of contact.

Most preferably the protrusions are adapted so that the contact points are substantially at the innermost and outermost edges of the pad.

In an alternative arrangement, the inner and outer protrusions are adapted so in the event of tilting of the pad they each define a contact point which lies substantially outside of the circumferential region of the brake disc that is braked by the main body of the brake pad.

In one notable arrangement the inner and outer protrusions may be separated by a linear central radial edge portion, suitably of linear or curved outline.

The alternative arrangement ensures that if wear does occur during normal operation with the brakes not applied, any such wear lies substantially outside of the main braked area and so does not create any significant judder vibration.

Looked at another way, the pad can be considered to have a central portion of the leading and trailing edges "cut-away".

The protrusions may be formed as an integral part of the pad body. They may be made from a different material to the main body or centre portion of the pad body.

Preferably, the protrusions are a harder material than the central portion of the pad body.

According to a second aspect of the invention we provide a brake pad for use in a brake assembly in accordance with the first aspect of the invention.

It will be understood that the modifications to the leading and trailing edges need not result in any of the protruding portions extending above the surface of the brake pad as this would prevent even application of the brake pad to the disc during braking. Instead, the protrusions extend substantially in the plane of the brake surface.

It is envisaged that the protruding portions form an integral part of the main body of the pad. However, it will be understood that in an alternative arrangement, the brake pad may be provided with one or more discrete wear regions. For example, four additional portions of friction material may be assembled with the backing plate (separate to the main brake pad), one for each corner. These additional portions may then act to define the contact points if the pad tilts when during normal operation.

BRIEF DESCRIPTION OF THE DRAWINGS

There will now be described, by way of example only, several embodiments of the present invention, with reference to the accompanying drawings in which:

FIG. 9 is a table of experimental results obtained using a brake pad substantially as shown in FIG. 6.

DETAILED DESCRIPTION OF THE DRAWINGS

Figure 1:
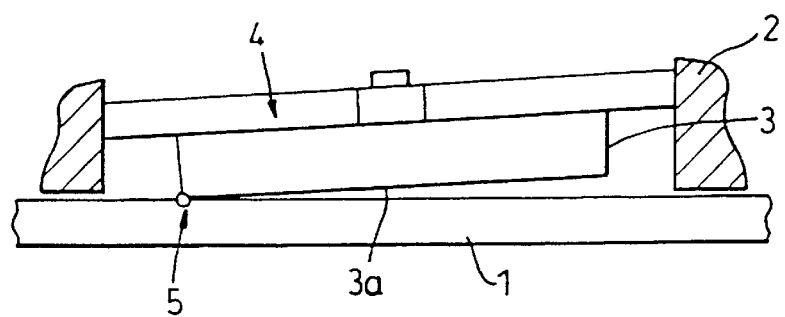
FIG. 1 illustrates a typical disc brake assembly.

A known disc brake assembly is shown in FIG. 1. The assembly comprises a brake disc 1 which is adapted to rotate about an axis, a brake pad 3 which is mounted onto a backing plate 2, and a brake caliper 2 (shown in part only). Generally, a pair of pads and backing plates are provided, one on each side of the disc, with the disc gripped between the two pads.

During normal running of the vehicle when the brakes are not applied, a small clearance is provided between the contact face 3a of the brake pad 3 and the surface of the brake disc 1. This allows free rotation of the brake disc 1 relative to the brake pad 3. When braking is required, the pad 3 is moved towards the disc 1, resulting in substantially even contact between pad 3 and disc 1 over the braked area 11 (shown in FIG. 5). This contact, and the associated friction developed between the pad 3 and disc 1 causes the desired braking effect to be achieved.

As shown in FIG. 1, when the brakes are not applied it is possible for a slight tilt of the pad surface 3a relative to the disc 1 surface to occur. This can result in contact 5 between disc 1 and pad 3. Whilst such contact is typically only associated with a light contact pressure, over time it can nevertheless result in the unevenness of the wear of the disc at the contact area 5, causing the disc 1 to wear down over extended periods of driving. For example if the disc does not run true but has a "run-out" commonly due to manufacturing tolerances resulting from thermo-mechanical loading, the wear can be uneven. If the wear of the disc is uneven across the braked area 11 of the disc 1, a disc thickness variation can occur (DTV), which can cause judder vibration.

Figure 2:
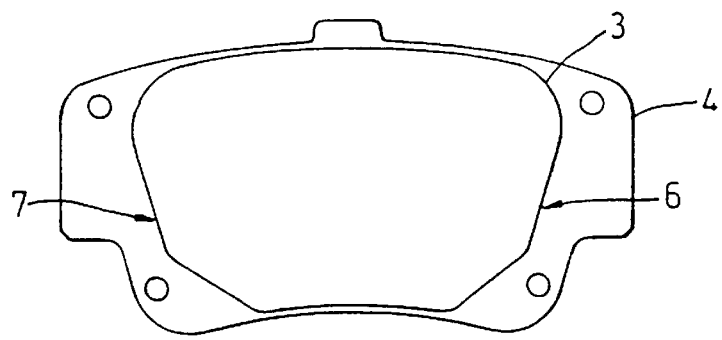
FIG. 2 illustrates a brake pad known in the prior art.

FIG. 2 illustrates a prior art brake pad for use in an assembly such as that shown in FIG. 1. As can be seen, tilting of the pad 3 relative to the disc 1 will result in a broad line of contact along either the leading or trailing edges (6 or 7), depending on the direction of tilt. Alternatively, the tilting may result in substantially a point contact. In each case, the contact causes the disc to wear substantially over the central portion of the braked region 11 of the brake disc 1 (i.e. the braking surface).

Figure 3:
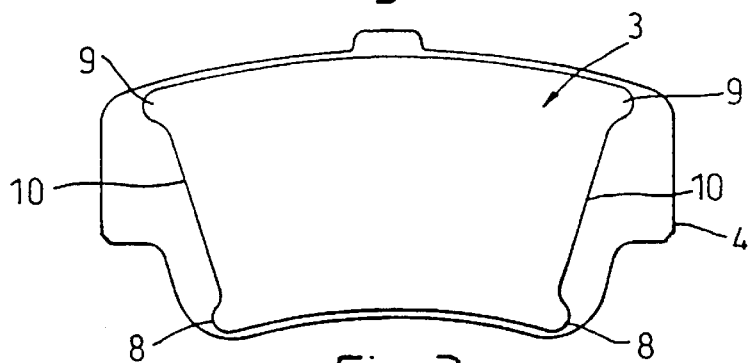
FIG. 3 illustrates a first embodiment of a brake pad of the present invention.
Figure 4:
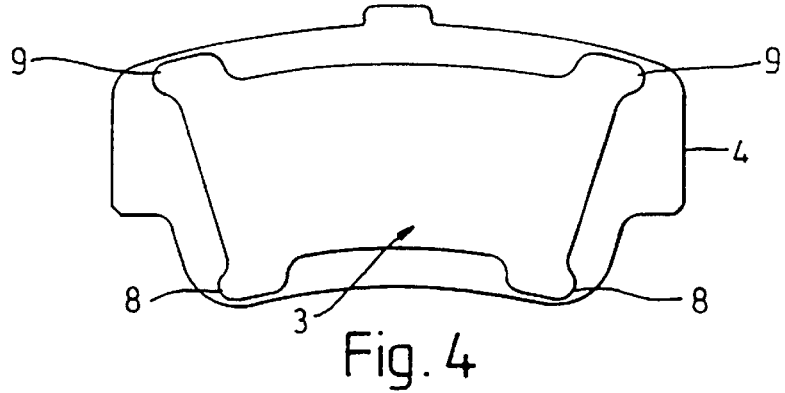
FIG. 4 illustrates a second embodiment of a brake pad of the present invention.

FIG. 3 and FIG. 4 show two alternative embodiments of the present invention. Both embodiments differ from the prior art in that the leading and trailing edges of the pad are modified by the provision of inner and outer circumferential protrusions 8,9.

The inner protrusions 8 and outer protrusions 9 are each adapted to define a substantially single point of contact between pad 3 and disc 1 in the event of tilt. They are separated by a linear central edge portion 10, substantially of linear or curved outline, with the inner 8 and outer 9 protrusions and the central edge portion 10 defining a leading and trailing edge of the pad 6, 7.

Figure 5:
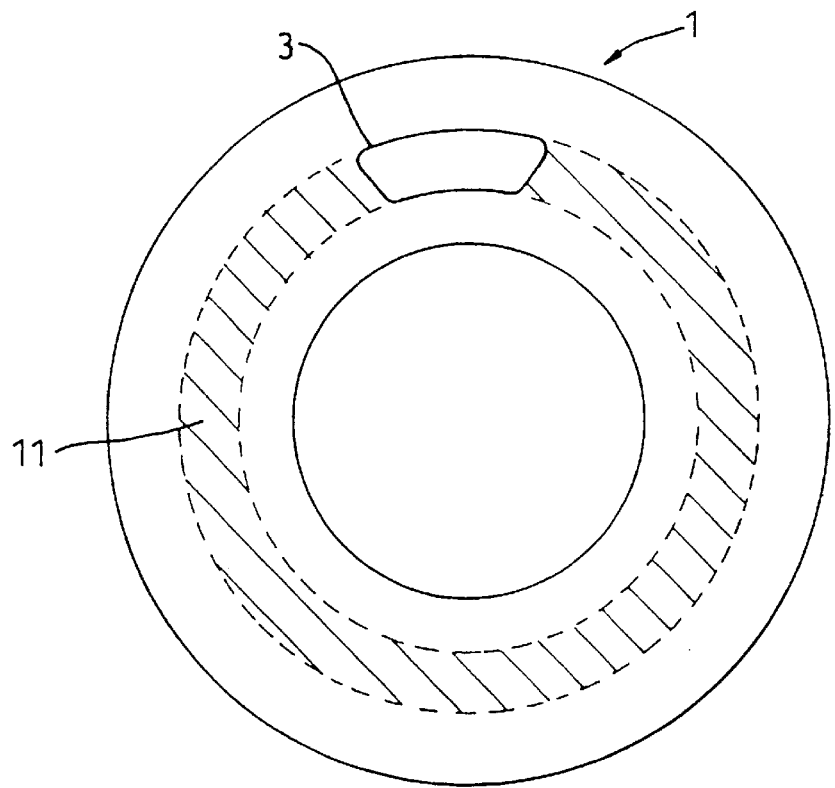
FIG. 5 illustrates the braked area of the brake disc which lies within the boundaries defined by the inner and outer circumferential edges of the brake pad.

In the event of tilt of the pads, contact between pad 3 and disc 1 is restricted to the inner and outer portions of the braked region 11 of the brake disc shown in FIG. 5, typically two bands of substantially 10 mm radial thickness. This prevents wear over the central portion of the region 11, and leads to a reduction in pad vibration.

The embodiment of FIG. 4 differs from that of FIG. 3 in that the inner 8 and outer 9 protrusions extend in a manner whereby in the event of tilt the contact point or points between pad 3 and disc 1 lie radially outside or inside of the main braked area of the disc (i.e. the area covered by the main body). This can further reduce pad vibration by eliminating any wear of the disc 1 over the whole of the main braked region of the brake disc.

In a modification of the embodiments described above the protrusions 8 and 9 are provided by separate, discrete wear regions.

Figure 6:
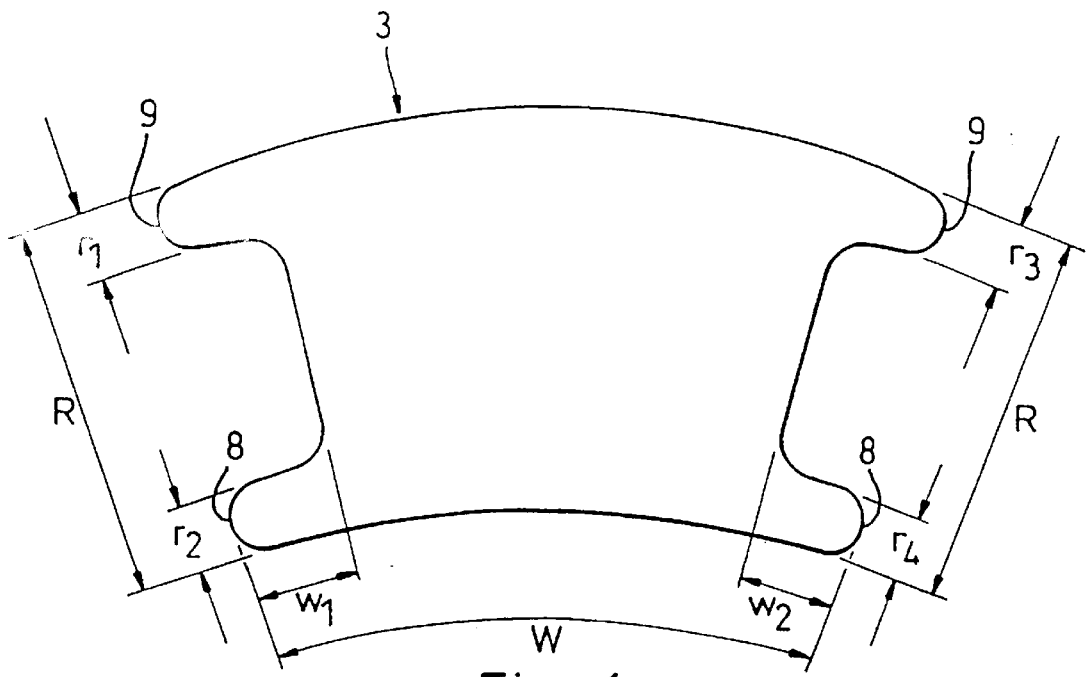
FIG. 6 illustrates the various dimensions of the brake pad of FIG. 3.

FIG. 6 illustrates the various relationships between the dimensions of the outer protrusions 9 and the inner protrusions 8 and the pad body.

As shown, the overall radial dimension of the pad is denoted as R, whilst the radial dimensions of the protrusions 8 and 9 are denoted by $r_1$, $r_2$, $r_3$ and $r_4$ respectively. The total width of the pad (including the protrusions) is denoted W, whilst the width of each protrusion in the circumferential direction is denoted by $w_1$, $w_2$, $w_3$ and $w_4$ respectively.

Whilst it is to be understood that the width and radial dimensions of each protrusion need not be identical, for convenience of explanation, it is assumed by way of example that $r_1=r_2=r_3=r_4$ and that $w_1=w_2=w_3=w_4$.

To understand the effect of the choice of dimension on the performance of the pad in reducing disc thickness variation, it is convenient to express the relationship between the total pad width or radial thickness with the width/thickness of each protrusion as a percentage where:

$$\% R = \frac{r}{R} \times 100\%$$

and $$\% W = \frac{w}{W} \times 100\%$$

Thus, assuming $r_1=r_2$ and $w_1=w_2$ etc, the value of % R and % W may be anywhere from 0% to 50%.

Figure 7:
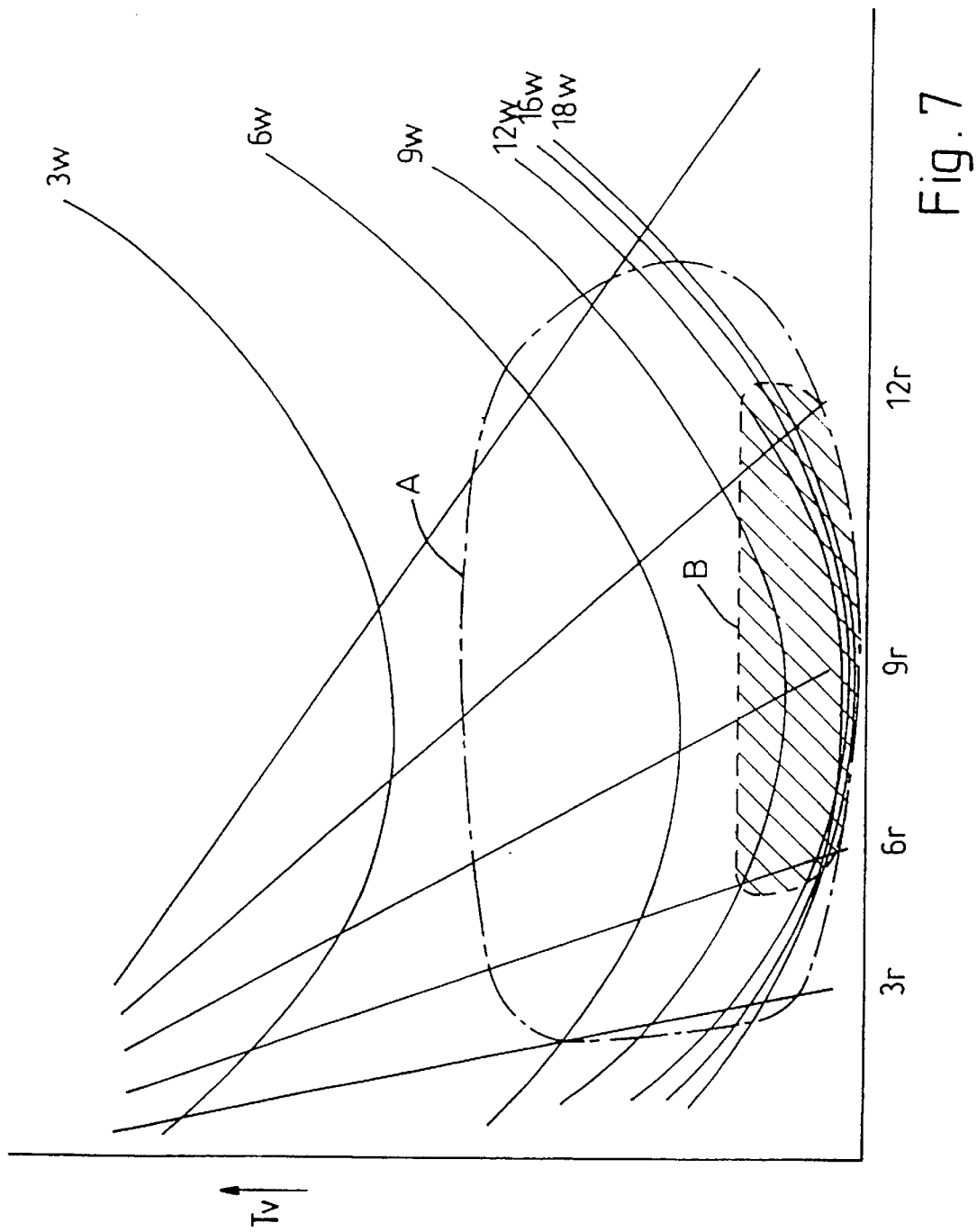
FIG. 7 shows an expected relationship between torque variation and the dimensions of the protrusions.

FIG. 7 shows a theoretical plot of the effect of changing the values of % R and % W on the disc thickness and torque variation as measured on a dynamometer. It is apparent that a gradual increase in the value of % W yields a corresponding decrease in torque variation, with decreasing returns being gained as the value of % W increases. Similarly, increasing the value of % R decreases the effectiveness of the protrusions in reducing judder. Henceforth, an optimal area A on the graph, as shown enclosed within the chain-dot line, is apparent, indicating an approximation of the desired pad dimensions. In at least one aspect, we seek protection for a pad having protrusions with dimensions substantially within this area of the graph. A more optimal solution B is found in the smaller area defined by the cross hatch lines, and in another aspect, protection is sought for a pad having dimensions within this area. Of course, it will be readily understood that now we have appreciated the benefits of providing protrusions on the pad in a brake system, we would not wish to be limited to providing pads having the dimensions contained within the marked areas of FIG. 7.

Figure 8:
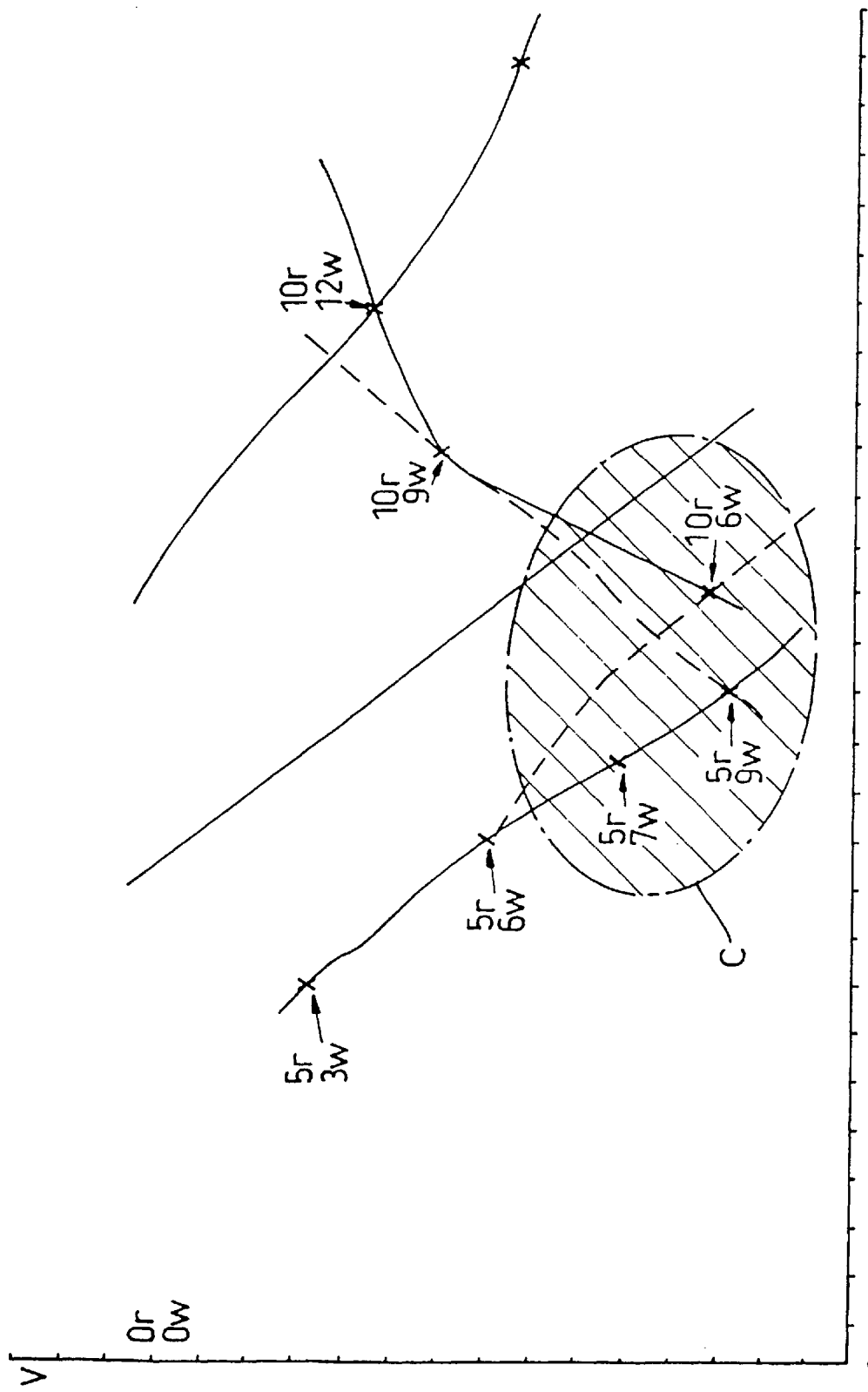
FIG. 8 shows some experimental results obtained from a brake pad as shown in FIG. 6.

FIG. 8 shows a set of actual experimental results obtained by testing an actual pad set on a brake disc on a dynamometer. The disc was run up to a speed to simulate a vehicle travelling at approximately 70 mph, and the variation in torque was measured as the brakes grabbed the disc. One area C in which it would be desirable to select the pad dimensions is enclosed by the cross hatching, corresponding to a value of % R=5–10% with % W=5–10%.

Finally, FIG. 9 is a table of results obtained from experimental testing on the dynamometer, showing changes in disc thickness variation and other parameters for different pad configurations.

What is claimed is:

1. A disc brake in which a friction pad assembly is adapted to be applied to one face of a rotatable disc by brake applying means housed in a housing mounted on a selectively stationary part adjacent of the disc, the friction pad assembly comprising a backing plate and a pad of friction material supported by the backing plate, and in which the friction pad assembly is guided for movement towards and away from the disc on drag taking surfaces which take drag on the friction pad assembly when the brake is applied, wherein said pad of friction material is provided at its radially most inner and outer edges of its leading edge with circumferentially projecting protrusions the sum of the radial thickness of the protrusions being small in comparison with the total radial thickness of the pad, and the arrangement being such that in the event of tilting of the pad assembly with respect of the disc when the brake is in the off position, contact between the protrusions and the disc presents contact between the remainder of the surface area of the pad and the disc.

2. A disc brake assembly according to claim 1, characterised in that the leading and trailing edges of the brake pad are adapted to prevent the said contact over the central portion of the braked area of the brake disc, each edge being provided with a pair of circumferential projecting protrusions.

3. A disc brake assembly according to claim 2, characterised in that on each of the leading and trailing edges an inner and outer protrusion is provided in a region proximal to the respective innermost and outermost portions of the edge of the brake pad.

4. A disc brake assembly according to claim 3, characterised in that each protrusion defines a single contact point in the event of pad tilt.

5. A disc brake assembly according to claim 4, characterised in that the contact points are substantially at the innermost and outermost edges of the pad.

6. A disc brake assembly according to claim 3, characterised in that the inner and outer protrusions are adapted so in the event of tilting of the pad they each define a contact point which lies substantially outside of the circumferential region of the brake disc that is braked by the main body of the brake pad.

7. A disc brake assembly according to any claim 2, characterised in that the inner and outer protrusions are separated by a linear central radial edge portion.

8. A disc brake assembly according to claim 2, characterised in that the width of each of the protrusion as a percentage of the total width of the pad is in the range 5% to 10%.

9. A disc brake assembly according to claim 2, characterised in that each protrusion comprises a discrete wear region which is separate from the main body of the pad.

10. A disc brake assembly according to claim 2, characterised in that the radial thickness of each protrusion as a percentage of the total radial thickness of the pad is substantially in the range 5% to 15%.

11. A disc brake assembly according to claim 1 characterised in that the protrusion is integral with the material of the pad.

12. A disc brake assembly according to claim 1, characterised in that the protrusion is made from a harder wearing material than the central portion of the main pad body.

13. A brake pad for use in a brake assembly comprising a pad of friction material provided with two protrusions which project from the leading edge in a circumferential direction, wherein the radial thickness of the protrusions is small in comparison with the total radial thickness of the pad itself, the arrangement being such that in its position of use when the pad is housed in a housing of a disc brake, in the event of tilting of the pad when the brake is in an off position, contact between the protrusions and the disc prevents contact between the remainder of the surface area of the pad and the disc.

* * * * *

UNITED STATES PATENT AND TRADEMARK OFFICE
CERTIFICATE OF CORRECTION

PATENT NO. : 6,234,284 B1
DATED : May 22, 2001
INVENTOR(S) : Ashman et al.

It is certified that error appears in the above-identified patent and that said Letters Patent is hereby corrected as shown below:

<u>Title page,</u>
Item [22], delete "Oct. 5, 1999" and insert -- Jan. 15, 1998 --

Signed and Sealed this

Sixth Day of August, 2002

*Attest:*

*Attesting Officer*

JAMES E. ROGAN
*Director of the United States Patent and Trademark Office*